(12) United States Patent
Namiki et al.

(10) Patent No.: US 8,735,535 B2
(45) Date of Patent: May 27, 2014

(54) PRODUCTION METHOD OF POLYCARBONATE RESIN

(71) Applicant: Mitsubishi Chemical Corporation, Chiyoda-ku (JP)

(72) Inventors: Shingo Namiki, Fukuoka (JP); Masanori Yamamoto, Fukuoka (JP)

(73) Assignee: Mitsubishi Chemical Corporation, Chiyoda-ku (JP)

( * ) Notice: Subject to any disclaimer, the term of this patent is extended or adjusted under 35 U.S.C. 154(b) by 0 days.

(21) Appl. No.: 14/041,636

(22) Filed: Sep. 30, 2013

(65) Prior Publication Data

US 2014/0031514 A1 Jan. 30, 2014

Related U.S. Application Data

(63) Continuation of application No. PCT/JP2012/058732, filed on Mar. 30, 2012.

(30) Foreign Application Priority Data

Mar. 30, 2011 (JP) ................................. 2011-076173

(51) Int. Cl.
*C08G 63/02* (2006.01)
*C08G 64/00* (2006.01)

(52) U.S. Cl.
USPC ............................. 528/371; 528/196; 528/198

(58) Field of Classification Search
USPC .......................................... 528/196, 198, 371
See application file for complete search history.

(56) References Cited

U.S. PATENT DOCUMENTS

| 6,265,523 B1 | 7/2001 | Nagai et al. |
| 8,445,624 B2 | 5/2013 | Fuji et al. |
| 8,487,067 B2 | 7/2013 | Namiki et al. |
| 2010/0216914 A1 | 8/2010 | Oda et al. |
| 2012/0232243 A1 | 9/2012 | Namiki et al. |
| 2013/0296526 A1 | 11/2013 | Namiki et al. |

FOREIGN PATENT DOCUMENTS

| JP | 11-343335 | 12/1999 |
| JP | 2005-509667 | 4/2005 |
| JP | 2009-91417 | 4/2009 |
| JP | 2010-150539 | 7/2010 |
| JP | 2010-150540 | 7/2010 |
| WO | 03/043959 | 5/2003 |
| WO | 2004/111106 | 12/2004 |
| WO | 2007/013463 | 2/2007 |
| WO | 2008/029746 | 3/2008 |
| WO | 2008/093860 | 8/2008 |
| WO | 2008/133342 | 11/2008 |
| WO | 2010/061928 | 6/2010 |

OTHER PUBLICATIONS

International Search Report issued Apr. 24, 2012 in PCT/JP2012/058732 filed Mar. 30, 2012.
U.S. Appl. No. 14/041,489, filed Sep. 30, 2013, Namiki, et al.
U.S. Appl. No. 14/042,102, filed Sep. 30, 2013, Namiki, et al.
U.S. Appl. No. 14/041,397, filed Sep. 30, 2013, Yokogi, et al.

*Primary Examiner* — Terressa Boykin
(74) *Attorney, Agent, or Firm* — Oblon, Spivak, McClelland, Maier & Neustadt, L.L.P.

(57) ABSTRACT

A method for producing a polycarbonate resin comprises a step of performing polycondensation through a transesterification reaction in the presence of a transesterification catalyst by using a dihydroxy compound as a raw material compound and a carbonic acid diester, wherein the dihydroxy compound comprises at least an aliphatic dihydroxy compound having an etheric oxygen atom on a hydroxy group, the raw material compound comprises the specific amount of a nitrogen-containing compound, and the production method of a polycarbonate resin comprises a step of previously heating the aliphatic dihydroxy compound at the specific temperature, holding the compound in the melted state for the specific time, and then mixing the melt with a carbonic acid diester.

16 Claims, No Drawings

PRODUCTION METHOD OF POLYCARBONATE RESIN

TECHNICAL FIELD

The present invention relates to a method for efficiently and stably producing a polycarbonate resin excellent in the light resistance, transparency, color hue, heat resistance, thermal stability and mechanical strength and stable in the performance.

BACKGROUND ART

A polycarbonate resin is generally produced using bisphenols as a monomer ingredient and by making use of its superiority such as transparency, heat resistance and mechanical strength, is widely utilized as a so-called engineering plastic in the fields of electric·electronic component, automotive component, optical recording medium and optics such as lens. However, in the application as an optically compensatory film of a flat panel display and the like which are rapidly spreading in recent years, higher optical characteristics such as low birefringence and low photoelastic coefficient are further required, and existing aromatic polycarbonate resins cannot meet the requirement. Also, the conventional polycarbonate resin is produced using a raw material derived from petroleum resources, but in recent years, depletion of petroleum resources is feared, and it is demanded to provide a polycarbonate resin using a raw material obtained from biomass resources such as plant. In addition, because of a concern that global warming due to increase or accumulation of carbon dioxide emissions may bring about climate change or the like, it is demanded to develop a polycarbonate using a plant-derived monomer as a raw material and being carbon neutral even when discarded after use.

Under these circumstances, a method using a special dihydroxy compound as a monomer ingredient, where a polycarbonate resin is obtained while subjecting a monohydroxy compound produced as a by-product by transesterification with a carbonic acid diester to removal by distillation under reduced pressure, has been proposed (see, for example, Patent Documents 1 to 3).

However, such a dihydroxy compound having a special structure is poor in the thermal stability, and its use as a raw material of a polycarbonate resin has a problem that the polymerization reactivity is reduced or coloration due to heat history at the preparation of a raw material or during polymerization occurs to impair the commercial value of the obtained polycarbonate resin. In particular, when it is intended to produce a polycarbonate resin in an industrial scale, a raw material must be kept under heating for a certain time period, and poor thermal stability of the raw material works out to a serious problem.

In order to solve this problem, there is disclosed a method of specifying the amount of impurities in the polycarbonate resin (for example, Patent Document 4) or adding a heat stabilizer to the polycarbonate resin (for example, Patent Document 5).

On the other hand, a method of adding a basic stability improver to a distillatively purified dihydroxy compound is disclosed (for example, Patent Document 6). Furthermore, a method of adding a basic metal salt as a stabilizer to a dihydroxy compound and using the product after distillative purification is disclosed (Patent Document 7).

BACKGROUND ART DOCUMENT

Patent Document

Patent Document 1: International Publication No. 2004/111106

Patent Document 2: International Publication No. 2007/013463

Patent Document 3: International Publication No. 2008/093860

Patent Document 4: International Publication No. 2008/029746

Patent Document 5: International Publication No. 2008/133342

Patent Document 6: JP-T-2005-509667 (the term "JP-T" as used herein means a published Japanese translation of a PCT patent application)

Patent Document 7: JP-A-2010-150540 (the term "JP-A" as used herein means an "unexamined published Japanese patent application")

SUMMARY OF INVENTION

Problem that Invention is to Solve

However, in the methods described in Patent Documents 4 and 5, the effect is not satisfactory, and there is a problem that among others, coloration in the step of preparing a dihydroxy compound as a raw material of a polycarbonate resin or reduction in the polymerization activity cannot be suppressed.

Also, in the method described in Patent Document 6, the stability improver contained in the dihydroxy compound works as a transesterification catalyst, and this causes a problem that the polymerization reaction of a polycarbonate resin can be hardly controlled or the stability improver itself brings about coloration of the polycarbonate resin.

In the method described in Patent Document 7, the heat stabilizer is present only in a liquid phase during distillative purification, leaving the possibility of causing new production of a coloration-causing substance or a polymerization inhibitor due to a heat history in the gas phase part, and there is a problem that since the obtained dihydroxy compound is resultantly free from a heat stabilizer, coloration or the like attributable to a heat history at the time of preparing a dihydroxy compound as a polymerization raw material may be caused.

An object of the present invention is to solve those conventional problems and provide a method for efficiently and stably producing a polycarbonate resin excellent in the light resistance, transparency, color hue, heat resistance, thermal stability and mechanical strength and stable in the performance.

Means for Solving Problem

As a result of a number of intensive studies to attain the above-described object, the present inventors have found that in the method for producing a polycarbonate resin by using a carbonic acid diester and a specific dihydroxy compound as raw material monomers and performing polycondensation through a transesterification reaction in the presence of a catalyst, when a nitrogen-containing compound is contained in a specific amount based on the dihydroxy compound, a polycarbonate resin excellent in the light resistance, transparency, color hue, heat resistance, thermal stability and mechanical strength and stable in the performance can be obtained.

That is, the present invention includes the following aspects [1] to [16].

[1] A method for producing a polycarbonate resin, comprising a step of performing polycondensation through a transesterification reaction in the presence of a transesterification catalyst by using a dihydroxy compound as a raw material compound and a carbonic acid diester, wherein:

the dihydroxy compound comprises at least an aliphatic dihydroxy compound having an etheric oxygen atom on at least one β-position or γ-position of a hydroxy group, the raw material compound comprises a nitrogen-comprising basic compound in an amount of 0.3 ppm to less than 10 ppm in terms of weight concentration of nitrogen atom based on the aliphatic dihydroxy compound, and the production method of a polycarbonate resin comprises a step of previously heating the aliphatic dihydroxy compound at 50° C. or more, holding the compound in the melted state for 0.5 to 200 hours, and then mixing the melt with a carbonic acid diester.

[2] The method for producing a polycarbonate resin as described in [1] above, comprising a step of mixing the aliphatic dihydroxy compound with a melted carboxylic acid diester.

[3] The method for producing a polycarbonate resin as described in [1] or [2] above, wherein the raw material compound is a raw material compound comprising an aliphatic dihydroxy compound obtained by heating the aliphatic dihydroxy compound that is a solid, in the presence of a nitrogen-containing basic compound to form a melted state and then distilling and purifying the melt and the content of the nitrogen-containing basic compound in the raw material compound is from 0.3 ppm to less than 10 ppm in terms of weight concentration of nitrogen atom based on the aliphatic dihydroxy compound.

[4] The method for producing a polycarbonate resin as described in [1] or [2] above, wherein the aliphatic dihydroxy compound that is a solid is heated in the presence of a nitrogen-containing basic compound to form a melted state and then used as a raw material compound of a polycarbonate resin without distilling and purifying the melt.

[5] The method for producing a polycarbonate resin as described in any one of [1] to [4] above, comprising a step of, after the solid aliphatic dihydroxy compound is put into a melted state, adding the transesterification catalyst and performing polycondensation through a transesterification reaction.

[6] The method for producing a polycarbonate resin as described in any one of [1] to [5] above, wherein the nitrogen-containing basic compound is an alkanolamine.

[7] The method for producing a polycarbonate resin as described in any one of [1] to [6] above, wherein the raw material compound comprises a hindered phenolic antioxidant.

[8] The method for producing a polycarbonate resin as described in any one of [1] to [7] above, wherein heating of the aliphatic dihydroxy compound is performed at 70° C. to less than 100° C.

[9] The method for producing a polycarbonate resin as described in any one of [1] to [8] above, comprising a step of mixing the aliphatic dihydroxy compound and the carboxylic acid diester, wherein the step is performed at 80° C. to less than 130° C.

[10] The method for producing a polycarbonate resin as described in any one of [1] to [9] above, wherein the step at the stage of 90 wt % or more of the aliphatic dihydroxy compound being consumed in the transesterification reaction is performed at less than 230° C.

[11] The method for producing a polycarbonate resin as described in any one of [1] to [10] above, wherein the raw material compound comprises a sodium compound and the content of the sodium compound is less than 2 ppm in terms of weight concentration of sodium atom based on the aliphatic dihydroxy compound.

[12] The method for producing a polycarbonate resin as described in any one of [1] to [11] above, wherein at least one metal compound selected from the group consisting of lithium and metals belonging to Group 2 of the long-form periodic table is used as the transesterification catalyst in an amount of 0.1 to 30 μmol in terms of total amount of metal atoms per mol of all dihydroxy compounds used as the raw material.

[13] The method for producing a polycarbonate resin as described in [12] above, wherein the transesterification catalyst is at least one compound selected from the group consisting of a magnesium compound and a calcium compound.

[14] The method for producing a polycarbonate resin as described in any one of [1] to [13] above, wherein the maximum temperature of the reaction solution is less than 250° C. at all reaction stages.

[15] The method for producing a polycarbonate resin as described in any one of [1] to [14] above, wherein the aliphatic dihydroxy compound has a cyclic ether structure.

[16] The method for producing a polycarbonate resin as described in any one of [1] to [15] above, wherein the aliphatic dihydroxy compound is a compound represented by the following formula (2):

[Chem. 1]

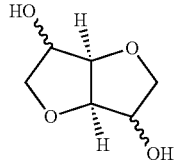

(2)

Effects of Invention

According to the present invention, a polycarbonate resin that is not only imparted with an excellent color hue but also excellent in the transparency, heat resistance, moldability and mechanical strength and has a performance enabling usage in the injection molding field for an electric•electronic component, an automotive component and the like, in the film and sheet field, in the bottle and container field, and furthermore, in a wide range of fields including lens application such as camera lens, viewfinder lens and lens for CCD or CMOS, and application as a film or sheet such as phase difference film, diffusing sheet and polarizing film utilized in liquid crystal or plasma display devices, as an optical disc, as an optical material, as an optical component or as a binder for fixing a dye, a charge transfer agent or the like, can be efficiently and stably produced.

Mode for Carrying Out Invention

The mode for carrying out the present invention is described in detail below, but the constituent requirements described below are an example (representative example) of the embodiment of the present invention, and the present invention is not limited to the following contents as long as its gist is observed.

Incidentally, the expression "(numerical or physical value) to (numerical or physical value)" as used in the description of the present invention is intended to include the numerical or physical values before and after "to". Also, in the description of the present invention, "vol %" and "mol" have the same meanings as "% by volume" and "mole", respectively, and when simply referred to as "ppm", this indicates "ppm by weight".

(Dihydroxy Compound)

The production method of a polycarbonate resin of the present invention uses a carbonic acid diester and a dihydroxy compound as raw material monomers and is characterized in that at least one of dihydroxy compounds is an aliphatic dihydroxy compound having an etheric oxygen atom on at least one β-position or γ-position of a hydroxy group (hereinafter referred to as "aliphatic dihydroxy compound (A) of the present invention").

Incidentally, the "aliphatic" in the aliphatic dihydroxy compound (A) of the present invention means that two hydroxyl groups are an alcoholic hydroxyl group, and the framework of the dihydroxy compound may have an aromatic ring structure or a heteroatom other than an aliphatic hydrocarbon structure. Also, the "etheric oxygen atom" means that the oxygen atom is single-bonded to two carbons, and this oxygen atom is differentiated from an oxygen atom constituting a hydroxyl group or a carbonyl group.

Furthermore, in the "aliphatic dihydroxy compound having an etheric oxygen atom on at least one β-position or γ-position of a hydroxy group", the β-position and γ-position mean that based on a carbon atom constituting a hydroxy group in the dihydroxy compound, the position of a carbon atom adjacent thereto is the α-position, the position of a carbon atom next adjacent thereto is the β-position, and the position of a carbon atom next-next adjacent thereto is the γ-position.

For example, in the case of the later-described isosorbide, a carbon atom corresponding to the β-position with respect to a carbon atom constituting a hydroxy group defines an etheric oxygen atom, and therefore, this compound comes under the "aliphatic dihydroxy compound having an etheric oxygen atom on the β-position of a hydroxy group".

In addition, the etheric oxygen atom is preferably a part of a structure represented by the following formula (1), that is, bonded to at least an ethylene group.

[Chem. 2]

(1)

The aliphatic dihydroxy compound (A) of the present invention specifically includes oxyalkylene glycols such as diethylene glycol, triethylene glycol, tetraethylene glycol and polyethylene glycol; a compound having an aromatic group in the side chain and having, in the main chain, an ether group bonded to the aromatic group, such as 9,9-bis(4-(2-hydroxyethoxy)phenyl)fluorene, 9,9-bis(4-(2-hydroxyethoxy)-3-methylphenyl)fluorene, 9,9-bis(4-(2-hydroxyethoxy)-3-isopropylphenyl)fluorene, 9,9-bis(4-(2-hydroxyethoxy)-3-isobutylphenyl)fluorene, 9,9-bis(4-(2-hydroxyethoxy)-3-tert-butylphenyl)fluorene, 9,9-bis(4-(2-hydroxyethoxy)-3-cyclohexylphenyl)fluorene, 9,9-bis(4-(2-hydroxyethoxy)-3-phenylphenyl)fluorene, 9,9-bis(4-(2-hydroxyethoxy)-3,5-dimethylphenyl)fluorene, 9,9-bis(4-(2-hydroxyethoxy)-3-tert-butyl-6-methylphenyl)fluorene and 9,9-bis(4-(3-hydroxy-2,2-dimethylpropoxy)phenyl)fluorene; and a compound having a cyclic ether structure, typified by dihydroxy compounds represented by the following formulae (2) and (3). Among the compounds having a cyclic ether structure, a compound having a plurality of ether structures in the compound is preferred, and a compound having a plurality of cyclic ether structures is more preferred. More specifically, among the compounds having a cyclic ether structure, an anhydrous sugar alcohol typified by a dihydroxy compound represented by the following formula (2) is preferred.

One of these compounds may be used alone, or two or more thereof may be used in combination, according to the performance required of the obtained polycarbonate resin.

[Chem. 3]

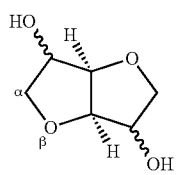

(2)

[Chem. 4]

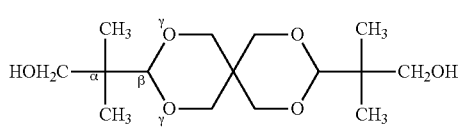

(3)

The dihydroxy compound represented by formula (2) includes isosorbide, isomannide and isoidide, which are in a stereoisomeric relationship. One of these compounds may be used alone, or two or more thereof may be used in combination.

Among these dihydroxy compounds, it is preferred in view of light resistance of the polycarbonate resin to use a dihydroxy compound having no aromatic ring structure, and above all, isosorbide obtained by dehydration condensation of sorbitol produced from various starches existing abundantly as a plant-derived resource and being easily available is most preferred from the aspects of ease of availability and production, light resistance, optical characteristics, moldability, heat resistance and carbon neutral.

In the production method of a polycarbonate resin of the present invention, the raw material monomer may contain a constituent unit derived from a hydroxy compound (hereinafter, referred to "dihydroxy compound (B)") other than the aliphatic dihydroxy compound (A) of the present invention, and the dihydroxy compound (B) includes aliphatic dihydroxy compounds such as ethylene glycol, 1,3-propanediol, 1,2-propanediol, 1,4-butanediol, 1,3-butanediol, 1,2-butanediol, 1,5-heptanediol and 1,6-hexanediol; alicyclic dihydroxy compounds such as 1,2-cyclohexanedimethanol, 1,3-cyclohexanedimethanol, 1,4-cyclohexanedimethanol, tricyclodecanedimethanol, pentacyclopentadecanedimethanol, 2,6-decalindimethanol, 1,5decalindimethanol, 2,3-decalindimethanol, 2,3-norbomanedimethanol, 2,5-norbornanedimethanol and 1,3-adamantanedimethanol; and aromatic bisphenols such as 2,2-bis(4-hydroxyphenyl)propane [=bisphenol A], 2,2-bis(4-hydroxy-3,5-dimethylphenyl)propane, 2,2-bis(4-hydroxy-3,5-diethylphenyl)propane, 2,2-bis(4-hydrox-(3,5-diphenyl)phenyl)propane, 2,2-bis(4-hydroxy-3,5-dibromophenyl)propane, 2,2-bis(4-hydroxyphenyl)pentane, 2,4'-dihydroxy-diphenylmethane, bis(4-hydroxyphenyl)methane, bis(4-hydroxy-5-nitrophenyl)methane, 1,1-bis(4-hydroxyphenyl)ethane, 3,3-bis(4-hydroxyphenyl)pentane, 1,1-bis(4-hydroxyphenyl)cyclohexane, bis(4-hydroxyphenyl)sulfone, 2,4'-dihydroxydiphenylsulfone, bis(4-hydroxyphenyl)sulfide, 4,4'-dihydroxydiphenyl ether, 4,4'-dihydroxy-3,3'-dichlorodiphenyl ether, 9,9-bis(4-(2-hydroxyethoxy-2-methyl)phenyl)fluorene, 9,9-bis(4-hydroxyphenyl)fluorene and 9,9-bis(4-hydroxy-2-methylphenyl)fluorene.

Above all, in view of light resistance of the polycarbonate resin, the dihydroxy compound (B) is preferably at least one compound selected from the group consisting of aliphatic dihydroxy compounds and alicyclic dihydroxy compounds. Among aliphatic dihydroxy compounds, particularly 1,3-propanediol, 1,4-butanediol and 1,6-hexane diol are preferred, and among alicyclic dihydroxy compounds, particularly 1,4-cyclohexanedimethanol and tricyclodecanedimethanol are preferred, but in view of heat resistance and mechanical properties, preferred are 1,4-cyclohexanedimethanol and tricyclodecanedimethanol, which are an alicyclic dihydroxy compound.

By using the dihydroxy compound (B), an effect of, for example, improving the flexibility of the polycarbonate resin, enhancing the heat resistance or improving the moldability can be obtained, but if the proportion of the contained constituent unit derived from the dihydroxy compound (B) is too large, this may lead to reduction in the mechanical properties or reduction in the heat resistance. Therefore, the ratio of the constituent unit derived from the aliphatic dihydroxy compound (A) of the present invention to the constituent units derived from all dihydroxy compounds is preferably 20 mol % or more, more preferably 30 mol % or more, still more preferably 50 mol % or more.

The raw material compound of the present invention contains a nitrogen-containing compound, and the content thereof must be from 0.3 ppm to less than 10 ppm in terms of weight concentration of nitrogen atom based on the aliphatic dihydroxy compound (A) of the present invention.

The aliphatic dihydroxy compound (A) of the present invention contains at least an aliphatic dihydroxy compound having an etheric oxygen atom on at least one β-position or γ-position of a hydroxy group and therefore, is likely to decompose to cause particularly reduction in the polymerization reactivity or deterioration of the color hue, but it is presumed that the decomposition reaction is suppressed by containing a specific amount of a nitrogen-containing compound.

If the content of the nitrogen-containing compound is too small, there is a tendency that the effects of the present invention are not obtained, whereas if the content is too large, this is not preferred, because the compound may act as a transesterification reaction catalyst, making it difficult to control the polymerization reaction, or the nitrogen-containing compound itself may promote coloration of the polycarbonate resin. The content of the nitrogen-containing compound is, in terms of weight concentration of nitrogen atom based on the aliphatic dihydroxy compound (A) of the present invention, preferably 0.5 ppm or more, more preferably 1 ppm or more, still more preferably 2 ppm or more, and preferably less than 8 ppm, more preferably less than 5 ppm, still more preferably less than 4.5 ppm.

The nitrogen-containing compound of the present invention is not particularly limited as long as it is a compound containing nitrogen, but a nitrogen-containing basic compound is preferred. Specifically, the compound includes a basic ammonium compound such as tetramethylammonium hydroxide, tetraethylammonium hydroxide, tetrapropylammonium hydroxide, tetrabutylammonium hydroxide, trimethylethylammonium hydroxide, trimethylbenzylammonium hydroxide, trimethylphenylammonium hydroxide, triethylmethylammonium hydroxide, triethylbenzylammonium hydroxide, triethylphenylammonium hydroxide, tributylbenzylammonium hydroxide, tributylphenylammonium hydroxide, tetraphenylammonium hydroxide, benzyltriphenylammonium hydroxide, methyltriphenylammonium hydroxide and butyltriphenylammonium hydroxide; pyridine and a derivative thereof, such as pyridine, 4-aminopyridine, 2-aminopyridine, N,N-dimethyl-4-aminopyridine, 4-diethylaminopyridine, 2-hydroxypyridine, 2-methoxypyridine and 4-methoxypyridine; imidazole and a derivative thereof, such as imidazole, 2-dimethylaminoimidazole, 2-methoxyimidazole, 2-mercaptoimidazole and 2-methylimidazole; a triazine compound such as 1,3,5-triazine, cyanuric acid and melamine; an amine-based compound such as diisobutylamine, trimethylamine, triethylamine, tributylamine, dimethylbenzylamine, ethylenediamine, pentamethylenediamine, hexamethylenediamine, aniline, aminoquinoline and morpholine; an amino acid such as lysine, arginine and histidine; lactams such as caprolactam and laurolactam; alkanolamines such as monoethanolamine, diethanolamine, triethanolamine, N-methyl-diethanolamine, N-propyldiethanolamine, N-isopropyldiethanolamine, N,N-dimethylmonoethanolamine and diethylethanolamine; a nitrogen-containing borate such as tetramethylammonium borohydride, tetrabutylammonium borohydride and tetrabutylammonium tetraphenylborate; and a hindered amine such as bis(2,2,6,6-tetramethyl-4-piperidyl)sebacate and bis-(1,2,2,6,6-pentamethyl-4-piperidyl)sebacate. Among these, a basic ammonium compound, imidazole and a derivative thereof, and alkanolamines are preferred, alkanolamines are more preferred, and diethanolamine is still more preferred.

The raw material compound of the present invention may contain a sodium compound, in addition to the nitrogen-containing compound, and the content of the sodium compound is preferably less than 2 ppm, more preferably less than 1 ppm, still more preferably less than 0.5 ppm, yet still more preferably less than 0.3 ppm, in terms of weight concentration of sodium atom based on the aliphatic dihydroxy compound (A) of the present invention. If the content of the sodium atom is large, the compound may act as a transesterification catalyst and disadvantageously, may make it difficult to control the polymerization reaction or may promote coloration of the polycarbonate resin. The quantity of sodium atom can be determined, for example, by the measurement using an inductively coupled plasma (hereinafter, sometimes simply referred to as ICP) mass spectrometer (hereinafter, sometimes simply referred to as ICP-MS).

The raw material compound of the present invention may contain a stabilizer such as reducing agent, antioxidant, oxygen scavenger, light stabilizer, antacid, pH stabilizer and heat stabilizer, in addition to those described above.

Among others, a hindered phenolic antioxidant is preferred, and specific examples thereof include 2,6-di-tert-butylphenol, 2,6-di-tert-butyl-p-cresol, 2,4-di-tert-butylphenol, 2-tert-butyl-4-methoxyphenol, 2-tert-butyl-4,6-dimethylphenol, 2,6-di-tert-butyl-4-methylphenol, 2,6-di-tert-butyl-4-ethylphenol, 2,5-di-tert-butylhydroquinone, n-octadecyl-3-(3',5'-di-tert-butyl-4'-hydroxyphenyl)propionate, 2-tert-butyl-6-(3'-tert-butyl-5'-methyl-2'-hydroxybenzyl)-4-methylphenyl acrylate, 2,2'-methylene-bis-(4-methyl-6-tert-butylphenol), 2,2'-methylene-bis-(6-cyclohexyl-4-methylphenol), 2,2'-ethylidene-bis-(2,4-di-tert-butylphenol), tetrakis-[methylene-3-(3',5'-di-tert-butyl-4'hydroxyphenyl)

propionate)-methane, and 1,3,5-trimethyl-2,4,6-tris-(3,5-di-tert-butyl-4-hydroxybenzyl)benzene.

In the case where the aliphatic dihydroxy compound (A) of the present invention is a compound having a cyclic ether structure, such as isosorbide, the compound is likely to be gradually oxidized by oxygen and therefore, it is important to prevent oxygen-induced decomposition by keeping away from migration of water during storage or production, use a oxygen scavenger or the like, or treat the dihydroxy compound in a nitrogen atmosphere. Isosorbide when oxidized may generate a decomposition product such as formic acid. For example, when isosorbide containing such a decomposition product is used as a raw material for the production of a polycarbonate resin, this disadvantageously leaves the possibility that coloration of the obtained polycarbonate resin obtained is caused, or the possibility that not only the physical properties are significantly deteriorated but also due to effect on the polymerization reaction, a polymer having a high molecular weight is not obtained.

The production method of a polycarbonate resin of the present invention is characterized by comprising a step of previously heating the aliphatic dihydroxy compound (A) of the present invention at 50° C. or more and holding the compound in the melted state. Such heating eliminates the need for extra heating at the time of mixing the compound in the melted state with the dihydroxy compound (B), a carbonic acid diester and the like or at the time of initiating the polymerization reaction, and the temperature of a heating medium in a raw material mixing tank or a polymerization reaction tank can be lowered. If the temperature of a heating medium in a raw material mixing tank or a polymerization reaction tank is high, a problem such as coloration may be caused. The aliphatic dihydroxy compound (A) of the present invention can be thus treated as a liquid and therefore, the accuracy of quantitative determination when feeding the raw material can be enhanced, as a result, a polycarbonate resin can be stably obtained while suppressing deterioration of the dihydroxy compound.

Also, the inside of a melting tank is completely purged by an inert gas such as nitrogen before melting the compound, and after the melting, such an inert gas is preferably flowed into the melt to cause bubbling.

The lower temperature limit at the time of previously melting the aliphatic dihydroxy compound (A) of the present invention is, as described above, 50° C. or more but is preferably 70° C. or more, more preferably 75° C. or more. The upper temperature limit is preferably less than 150° C., more preferably less than 120° C., still more preferably less than 100° C., and optimally less than 90° C. If the heating temperature is low, the melting speed of the aliphatic dihydroxy compound (A) of the present invention may be slowed down to cause reduction in the production efficiency, whereas if the heating temperature is high, thermal deterioration of the aliphatic dihydroxy compound (A) of the present invention may be brought about.

The time for which the aliphatic dihydroxy compound (A) of the present invention is previously heated and held in the melted state is from 0.5 to 200 hours, but in order to suppress thermal deterioration, the time is preferably 100 hours or less, more preferably 50 hours or less, still more preferably 24 hours or less. The expression "the aliphatic dihydroxy compound (A) is previously heated and held in the melted state" as used in the present invention means that before mixing with a carbonic acid diester as a carbonate source, the aliphatic dihydroxy compound (A) of the present invention is previously heated and held in the melted state, and also encompasses mixing with the dihydroxy compound (B) and holding in the melted state.

The time of holding in the melted state indicates a time period until mixing with a carbonic acid diester by taking, as a starting point, a point when the dihydroxy compound (A) of the present invention starts melting, and in the case of mixing the compound in the melted state with the dihydroxy compound (B), the time therefor is added. If the time of holding in the melted state is less than 0.5 hours, an non-melted material may remain to clog a raw material filter or the like or may impair the transportability.

The aliphatic dihydroxy compound (A) of the present invention may be distillatively purified in advance of the polymerization reaction. The distillation here may be batch distillation or continuous distillation and is not particularly limited. As for the distillation conditions, distillation is preferably performed under reduced pressure in an inert gas atmosphere such as argon or nitrogen, and for preventing property modification due to heat, distillation is preferably performed under the condition of 250° C. or less, more preferably 200° C. or less, still more preferably 180° C. or less.

Such distillative purification gives an excessive heat history to the aliphatic dihydroxy compound (A) of the present invention and leaves the possibility that an impurity responsible for coloration or reduction of polymerization activity is produced during distillation, and therefore, a nitrogen-containing compound is preferably contained also after the distillative purification. The method therefor includes a method of adding a nitrogen-containing compound to the distillatively purified dihydroxy compound during or immediately after the distillation of the aliphatic dihydroxy compound (A) of the present invention, and a method of causing the nitrogen-containing compound contained before distillation to be distilled by itself together with the dihydroxy compound.

The amount of the nitrogen-containing compound contained in the distillatively purified raw material compound is preferably from 0.3 ppm to less than 10 ppm in terms of weight concentration of nitrogen atom based on the aliphatic dihydroxy compound (A) of the present invention. If the content of the nitrogen-containing compound is large, the compound acts as a transesterification reaction catalyst during polymerization, making it difficult to control the polymerization reaction, or the nitrogen-containing compound itself may promote coloration of the polycarbonate resin, whereas if the content is small, the thermal stability of the dihydroxy compound after distillative purification is reduced. Therefore, the content of the nitrogen-containing compound is, in terms of weight concentration of nitrogen atom based on the aliphatic dihydroxy compound (A) of the present invention, preferably 0.5 ppm or more, more preferably 1 ppm or more, still more preferably 2 ppm or more, and preferably less than 8 ppm, more preferably less than 5 ppm, still more preferably less than 4.5 ppm.

In the present invention, in order to eliminate an excessive heat history and reduce the energy loss, distillative purification of the aliphatic dihydroxy compound (A) of the present invention is preferably not performed. In the present invention, the concentration of the nitrogen-containing compound contained in the aliphatic dihydroxy compound (A) of the present invention is kept to the minimum and therefore, even when distillative purification is not performed, the polymerization reaction can be easily controlled while maintaining a good color hue.

(Carbonic Acid Diester)

In the present invention, a polycarbonate resin can be obtained by using a dihydroxy compound containing the above-described aliphatic dihydroxy compound (A) of the present invention and a carbonic acid diester as raw materials and polycondensing these materials through a transesterification reaction therebetween. The carbonic acid diester for use in the present invention includes usually a compound represented by the following formula (4). One of these carbonic acid diesters may be used alone, or two or more thereof may be mixed and used.

[Chem. 5]

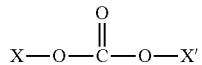

(4)

(in formula (4), each of X and X' is a substituted or unsubstituted aliphatic group having a carbon number of 1 to 18 or a substituted or unsubstituted aromatic group, and X and X' may be the same or different).

Examples of the carbonic acid diester represented by formula (4) include diphenyl carbonate, a substituted diphenyl carbonate such as ditolyl carbonate, dimethyl carbonate, diethyl carbonate, and di-tert-butyl carbonate. Among these, diphenyl carbonate and a substituted diphenyl carbonate are preferred, and diphenyl carbonate is more preferred. One of these carbonic acid diesters may be used alone, or two or more thereof may be mixed and used. Incidentally, the raw material compound containing a carbonic acid diester sometimes contains an impurity such as chloride ion, and the impurity may inhibit the polymerization reaction or impair the color hue of the polycarbonate resin obtained. Therefore, it is preferred to use a compound that has been purified by distillation or the like as needed.

In the method of the present invention, the dihydroxy compound (A) of the present invention, the dihydroxy compound (B), if desired, and a carbonic acid diester, which are raw materials, can be mixed before the transesterification reaction and fed to a polymerization reaction tank.

The temperature at the mixing is usually 80° C. or more, preferably 90° C. or more, and the upper limit thereof is usually less than 200° C., preferably less than 150° C., more preferably less than 130° C. Above all, the temperature is suitably from 100° C. to less than 125° C. If the temperature at the mixing is too low, the homogenization speed may be low or the solubility may lack, leaving the possibility of often causing a problem such as solidification. On the other hand, if the temperature at the mixing is too high, a transesterification reaction between the aliphatic dihydroxy compound (A) of the present invention and a carbonic acid diester may start taking place, leading to an increase in the liquid viscosity or thermal deterioration of the aliphatic dihydroxy compound (A) of the present invention, as a result, the color hue of the obtained polycarbonate resin may be worsened to adversely affect the light resistance or heat resistance.

In the present invention, from the standpoint of preventing worsening of the color hue, the operation of mixing a dihydroxy compound containing the aliphatic dihydroxy compound (A) of the present invention and a carbonic acid diester, which are raw materials, is preferably performed in an atmosphere having an oxygen concentration of 10 vol % or less, more preferably from 0.0001 to 10 vol %, still more preferably from 0.0001 to 5 vol %, yet still more preferably from 0.0001 to 1 vol %.

In the present invention, the carbonic acid diester is used in a molar ratio of usually from 0.90 to 1.20, preferably from 0.95 to 1.10, more preferably from 0.97 to 1.03, still more preferably from 0.99 to 1.02, based on all dihydroxy compounds used for the reaction containing the aliphatic dihydroxy compound (A) of the present invention. If this molar ratio is too large or too small, the transesterification speed may be reduced and the heat history during the polymerization reaction may be increased, as a result, the color hue of the obtained polycarbonate resin may be impaired and furthermore, a desired high-molecular polymer may not be obtained.

In the method of the present invention, the aliphatic dihydroxy compound (A) of the present invention and a carbonic acid diester, which are raw material monomers, may be prepared separately and each independently fed to a polymerization reaction tank, or in the case of performing copolymerization by using the dihydroxy compound (B), the dihydroxy compound (B) and a carbonic acid diester may be mixed and fed to a polymerization tank separately from the aliphatic dihydroxy compound (A) of the present invention. Also, these may be mixed in a pipe before entering the polymerization tank and fed to the polymerization tank.

(Transesterification Catalyst)

In the method of the present invention, at the time of producing a polycarbonate resin by performing, as described above, a transesterification reaction of a dihydroxy compound containing the aliphatic dihydroxy compound (A) of the present invention and a carbonic acid diester, a transesterification reaction catalyst (hereinafter, sometimes simply referred to as "catalyst") is caused to exist.

The catalyst of the present invention includes a compound of a metal belonging to Group 1 or 2 of the long-form periodic table (hereinafter, simply referred to as "Group 1" or "Group 2"), and a basic compound such as basic boron compound, basic phosphorus compound, basic ammonium compound and amine-based compound. The catalyst is preferably at least either one of a Group 1 metal compound and a Group 2 metal compound.

Together with at least either one of a Group 1 metal compound and a Group 2 metal compound, a basic compound such as basic boron compound, basic phosphorus compound, basic ammonium compound and amine-based compound may be secondarily used in combination.

As for the form of the at least either one of a Group 1 metal compound and a Group 2 metal compound, the compound is usually used in the form of a hydroxide or a salt such as carbonate, carboxylate and phenoxide, but a hydroxide, a carbonate and an acetate are preferred in view of ease of availability and handling, and an acetate is preferred in view of color hue and polymerization activity.

The Group 1 metal compound includes, for example, sodium hydroxide, potassium hydroxide, lithium hydroxide, cesium hydroxide, sodium hydrogencarbonate, potassium hydrogencarbonate, lithium hydrogencarbonate, cesium hydrogencarbonate, sodium carbonate, potassium carbonate, lithium carbonate, cesium carbonate, sodium acetate, potassium acetate, lithium acetate, cesium acetate, sodium stearate, potassium stearate, lithium stearate, cesium stearate, sodium boron hydride, potassium boron hydride, lithium boron hydride, cesium boron hydride, sodium boron phenylate, potassium boron phenylate, lithium boron phenylate, cesium boron phenylate, sodium benzoate, potassium benzoate, lithium benzoate, cesium benzoate, disodium hydrogenphosphate, dipotassium hydrogenphosphate, dilithium hydrogenphosphate, dicesium hydrogenphosphate, disodium phenylphosphate, dipotassium phenylphosphate, dilithium phenylphosphate, dicesium phenylphosphate, alcoholates and phenolates of sodium, potassium, lithium and cesium, and disodium, dipotassium, dilithium and dicesium salts of bisphenol A. Among these, a lithium compound is preferred.

The Group 2 metal compound includes, for example, calcium hydroxide, barium hydroxide, magnesium hydroxide, strontium hydroxide, calcium hydrogencarbonate, barium hydrogencarbonate, magnesium hydrogencarbonate, strontium hydrogencarbonate, calcium carbonate, barium carbonate, magnesium carbonate, strontium carbonate, calcium acetate, barium acetate, magnesium acetate, strontium acetate, calcium stearate, barium stearate, magnesium stearate, and strontium stearate. Among these, a magnesium compound, a calcium compound and a barium compounds are preferred, at least one metal compound selected from the group consisting of a magnesium compound and a calcium compound is more preferred in view of the polymerization activity and color hue of the obtained polycarbonate resin, and a calcium compound is most preferred.

The basic boron compound includes, for example, sodium, potassium, lithium, calcium, barium, magnesium and strontium salts of tetramethylboron, tetraethylboron, tetrapropylboron, tetrabutylboron, trimethylethylboron, trimethylbenzylboron, trimethylphenylboron, triethylmethylboron, triethylbenzylboron, triethylphenylboron, tributylbenzylboron, tributylphenylboron, tetraphenylboron, benzyltriphenylboron, methyltriphenylboron and butyltriphenylboron.

The basic phosphorus compound includes, for example, triethylphosphine, tri-n-propylphosphine, triisopropylphosphine, tri-n-butylphosphine, triphenylphosphine, tributylphosphine, and a quaternary phosphonium salt.

The basic ammonium compound includes, for example, tetramethylammonium hydroxide, tetraethylammonium hydroxide, tetrapropylammonium hydroxide, tetrabutylammonium hydroxide, trimethylethylammonium hydroxide, trimethylbenzylammonium hydroxide, trimethylphenylammonium hydroxide, triethylmethylammonium hydroxide, triethylbenzylammonium hydroxide, triethylphenylammonium hydroxide, tributylbenzylammonium hydroxide, tributylphenylammonium hydroxide, tetraphenylammonium hydroxide, benzyltriphenylammonium hydroxide, methyltriphenylammonium hydroxide, and butyltriphenylammonium hydroxide.

The amine-based compound includes, for example, 4-aminopyridine, 2-aminopyridine, N,N-dimethyl-4-aminopyridine, 4-diethylaminopyridine, 2-hydroxypyridine, 2-methoxypyridine, 4-methoxypyridine, 2-dimethylaminoimidazole, 2-methoxyimidazole, imidazole, 2-mercaptoimidazole, 2-methylimidazole, and aminoquinoline.

The amount of the polymerization catalyst used is usually from 0.1 to 300 µmol, preferably from 0.5 to 100 µmol, more preferably from 0.5 to 50 µmol, still more preferably from 0.5 to 20 µmol, yet still more preferably from 1 to 5 µmol, per mol of all dihydroxy compounds used. Among others, in the case of using a compound containing at least one metal selected from lithium and metals belonging to Group 2, the amount of the catalyst is, in terms of metal amount, usually 0.1 µmol or more, preferably 0.5 µmol or more, more preferably 0.7 µmol or more, per mol of all dihydroxy compounds used. The upper limit is usually 30 µmol, preferably 20 µmol, more preferably 5 µmol, still more preferably 3 µmol, yet still more preferably 2 µmol.

The catalyst may be added directly to the polymerization reaction bath or may be previously added to a dihydroxy compound or added to a carbonic acid diester. Also, a method where the catalyst is added to a raw material preparation tank in which a dihydroxy compound and a carbonic acid diester are previously mixed, and thereafter, caused to exist in the polymerization reaction tank may be employed, or the catalyst may be added in a pipe for feeding the raw material to the raw material reaction tank. In any case, there is a tendency that when the aliphatic hydroxy compound (A) of the present invention is kept in the melted state at a temperature of 50° C. or more and thereafter added, the uniformity between the catalyst and the dihydroxy compound is increased and the polymerization reaction is stabilized.

If the amount of the catalyst used is too small, a sufficient polymerization activity is not obtained and the progress of the polymerization reaction is slowed down, as a result, not only a polycarbonate resin having a desired molecular weight can be hardly obtained and the production efficiency is reduced but also the rate at which the raw material monomers are incorporated into the polycarbonate resin is decreased and the amount of monomers distilled out together with the by-product monohydroxy compound is increased, leaving the possibility that the specific raw material consumption may be worsened and an extra energy may be required to recover the raw material. Furthermore, in the case of copolymerization using a plurality of dihydroxy compounds, a change may be caused to occur between the compositional ratio of monomers used as raw materials and the compositional ratio of constituent monomer units in the product polycarbonate resin.

On the other hand, if the amount of the catalyst used is too large, the above-described distillation of unreacted monomers may be improved, but the color hue, light resistance, thermal stability and the like of the obtained polycarbonate resin may be worsened.

Also, a Group 1 metal, among others, sodium, potassium or cesium, in particular, sodium, when contained in a large amount in the polycarbonate resin, may adversely affect the color hue, and the metal may migrate not only from the catalyst used but also from the raw material or reaction apparatus. In the polycarbonate resin, the total amount of compounds containing such a Group 1 metal is, as the metal amount (in terms of atom), usually less than 2 ppm by weight, preferably 1 ppm by weight or less, more preferably less than 0.7 ppm by weight.

The metal amount in the polycarbonate resin can be measured by atomic emission, atomic absorption, ICP emission, ICP mass spectroscopy or other methods after recovering the metal in the polycarbonate resin by a wet ashing method or the like.

In the method of the present invention, a carbonic acid diester and a dihydroxy compound are caused to undergo a transesterification reaction in the presence of a catalyst and thereby polycondensed (sometimes simply referred to as "polymerized") in multiple stages by using a plurality of reaction vessels. The reason to perform the polymerization by using a plurality of reaction vessels is that: in the initial stage of polymerization reaction, the content of monomers in the reaction solution is large and therefore, it is important to suppress volatilization of monomers while maintaining a necessary polymerization rate; and in the later stage of polymerization reaction, it is important to sufficiently distill off the by-product monohydroxy compound so as to shift the equilibrium to the polymerization side. For setting different polymerization reaction conditions in this way, a plurality of polymerization reaction vessels arranged in series are preferably used in view of production efficiency.

The number of reaction vessels used in the method of the present invention may be at least 2 or more but in view of production efficiency and the like, is preferably 3 or more.

In the present invention, when two or more reaction vessels are used, the reaction vessels may be designed to, for example, further have a plurality of reaction stages differing in the conditions or be continuously changed in the temperature•pressure.

Examples thereof include a case where two reaction vessels are used and the reaction conditions are made different from each other to perform the polymerization in two stages, and a case where two reaction vessels are used and while two reaction stages differing in the conditions are imparted by the first reaction vessel, one reaction condition is imparted by the second reaction vessel to perform the polymerization in three stages.

The amount of the monohydroxy compound produced is large at the initial stage of polymerization and an unreacted dihydroxy compound may be distilled off together to change the molar ratio of the monohydroxy compound and the carbonic acid diester from that when charged, causing the polymerization reaction to plateau. In the case of obtaining a copolymer by using a plurality of dihydroxy compounds, the copolymerization ratio may become unstable.

Therefore, a reflux condenser is preferably provided in at least one polymerization reaction tank.

The temperature of the cooling medium introduced into the reflux condenser is, at the inlet of the reflux condenser, preferably from 45 to 180° C., more preferably from 80 to 150° C., still more preferably from 100 to 130° C. If the temperature of the cooling medium is too high, the reflux amount tends to decrease, leading to reduction in the effect, whereas if the temperature is too low, the distillation efficiency for the monohydroxy compound that should be originally removed by distillation tends to decrease. Examples of the cooling medium used include warm water, steam, and heating medium oil, with steam and heating medium oil being preferred.

In order to attain the object of the present invention, the kind of catalyst, the amount of catalyst, the temperature of polymerization, the pressure and the residence time must be appropriately controlled according to the progress of polymerization.

Also, at the initial stage of polymerization, even when a reflux condenser is provided, if the temperature is excessively raised or the pressure is excessively reduced, an unreacted monomer distills out to disrupt the molar ratio of a dihydroxy compound and a carbonic acid diester, causing reduction in the polymerization rate or leaving the possibility that a polycarbonate resin having a predetermined molecular weight or terminal group may not be obtained. Furthermore, if the temperature is excessively raised at the stage where a large amount of the aliphatic dihydroxy compound (A) of the present invention is contained in the unreacted state, coloration occurs to adversely affect the color hue of the finally obtained polycarbonate resin. Therefore, the polymerization temperature at the stage where 90 wt % or less of the aliphatic dihydroxy compound (A) of the present invention is consumed in the transesterification reaction (hereinafter, sometimes referred to as "oligomer production stage") is preferably less than 230° C., more preferably less than 220° C., still more preferably less than 210° C., yet still more preferably less than 200° C. On the other hand, if the temperature at the oligomer production stage is too low, the polymerization reaction rate is slowed down and the production efficiency is reduced. Therefore, the temperature is usually 150° C. or more, preferably 170° C. or more, more preferably 180° C. or more.

The polymerization temperature as used in the present invention indicates the temperature of the polymerization solution measured by an inner thermometer usually provided in the polymerization reaction tank. In the case of performing the polymerization in a batch system, the internal temperature often changes with time and therefore, the polymerization temperature indicates a maximum temperature thereof. In the case of a continuous system, a given value is usually set for each polymerization tank and therefore, the polymerization temperature indicates the set temperature.

Furthermore, in order to suppress volatilization of a dihydroxy compound or a carbonic acid diester, the polymerization pressure (absolute pressure) at the oligomer production stage is usually 1 kPa or more, preferably 3 kPa or more, more preferably 5 kPa or more, still more preferably 10 kPa or more, yet still more preferably 15 kPa or more. On the other hand, if the polymerization pressure is too high, the progress of the polymerization reaction is slowed down and an extra heat history may be produced or the production efficiency may be reduced. Therefore, the polymerization pressure is usually 2,000 kPa or less, preferably 1,000 kPa or less, more preferably 100 kPa or less, still more preferably 50 kPa or less, yet still more preferably 30 kPa or less.

The polymerization time at the oligomer production stage is usually from 0.1 to 10 hours, preferably from 0.5 to 5 hours, more preferably from 1 to 3 hours. If the polymerization time is too short, the polymerization reaction rate is slowed down and not only the production efficiency is reduced but also the above-described volatilization of an unreacted monomer tends to be caused. On the other hand, if the polymerization time is too long, the color hue may be worsened due to heat history.

At the stage (hereinafter, sometimes referred to as "late polymerization stage") following the oligomer production stage, the pressure of the reaction system is gradually lowered from the pressure at the oligomer production stage and subsequently, while removing the generated monohydroxy compound out of the reaction system, the reaction is performed by setting finally the polymerization pressure to be usually 2 kPa or less, preferably 1 kPa or less. If the pressure is too high, the polymerization time at the later polymerization stage is prolonged and the production efficiency may be reduced or the color hue may be worsened due to increase of the heat history. Also, in view of color hue, it is preferred to at least partially distill off the nitrogen-containing compound of the present invention by reducing the pressure at the later polymerization stage and thereby decrease the content thereof in the polycarbonate resin as a final product.

The internal temperature at the later polymerization stage is, in terms of maximum temperature, usually from 210 to 270° C., preferably from 220 to 250° C., more preferably from 220 to 245° C. If the temperature at the later polymerization stage is too low, the polymerization time is prolonged and the production efficiency may be reduced or the color hue may be worsened due to increase of the heat history. On the other hand, if the polymerization temperature is too high, the color hue may be worsened or the polycarbonate resin may be decomposed.

In the method of the present invention, the maximum temperature of the reaction solution is preferably less than 250° C. at all reaction stages.

The polymerization time at the late polymerization stage is usually from 0.5 to 10 hours, preferably from 1 to 8 hours, more preferably from 2 to 5 hours. If the polymerization time is too short, not only the production efficiency is reduced but also the a polycarbonate resin having a predetermined molecular weight may not be obtained. On the other hand, if the polymerization time is too long, the color hue may be worsened due to heat history.

The molecular weight of the polycarbonate resin obtained by the method of the present invention can be expressed by a reduced viscosity, and the reduced viscosity is usually 0.30 dL/g or more, preferably 0.35 dL/g or more, and the upper limit of the reduced viscosity is 1.20 dL/g or less, preferably 1.00 dL/g or less, more preferably 0.80 dL/g or less.

If the reduced viscosity of the polycarbonate resin is too low, the mechanical strength of the molded article may be low, whereas if the reduced viscosity is too high, the flowability at the molding tends to lower, reducing the productivity and moldability.

Incidentally, the reduced viscosity is determined by preparing a solution having a polycarbonate resin concentration precisely adjusted to 0.6 g/dL with use of methylene chloride as a solvent and measuring the viscosity by means of an Ubbelohde viscosity tube at a temperature of 20.0° C±0.1° C.

The polycarbonate resin obtained by the method of the present invention is usually cooled/solidified after the polymerization described above and then pelletized by a rotary cutter or the like. The method for pelletization is not limited, but examples thereof include: a method where the resin is withdrawn in the melted state from the final polymerization reaction tank, cooled/solidified in the form of a strand and then pelletized; a method where the resin is fed in the melted state from the final polymerization reaction tank to a single- or twin-screw extruder, melt-extruded, cooled/solidified and then pelletized; and a method where the resin is withdrawn in the melted state from the final polymerization reaction tank, cooled/solidified in the form of a strand and once pelletized and thereafter, the resin is again fed to a single- or twin-screw extruder, melt-extruded, cooled/solidified and then pelletized.

At this time, in the extruder, residual monomers may be devolatilized under reduced pressure, or a heat stabilizer, a neutralizing agent, an ultraviolet absorber, a release agent, a coloring agent, an antistatic agent, a slip agent, a lubricant, a plasticizer, a compatibilizer, a flame retardant and the like, which are usually known, may be also added and kneaded.

Also, in order to prevent inclusion of an extraneous matter after extrusion, the extrusion of the polycarbonate resin is preferably performed in a clean room having a cleanliness defined in JIS B 9920 (2002) of preferably higher than class 7, more preferably higher than class 6.

Furthermore, at the time of cooling and chip-forming the extruded polycarbonate resin, a cooling method such as air cooling and water cooling is preferably used. As for the air used in air cooling, an air in which an airborne extraneous matter is previously removed through a hepafilter or the like is preferably used so as to prevent reattachment of an airborne extraneous matter. In the case of employing water cooling, water in which a metallic matter is removed by using an ion-exchange resin or the like and an extraneous matter in water is further removed through a filter, is preferably used. The opening size of the filter used is preferably from 10 to 0.45 μm in terms of filtration accuracy for 99% rejection.

The polycarbonate resin obtained by the method of the present invention can be formed into a molded product by a commonly known method such as injection molding method, extrusion molding method and compression molding method.

Also, before performing various moldings, an additive such as heat stabilizer, neutralizing agent, ultraviolet absorber, release agent, coloring agent, antistatic agent, slip agent, lubricant, plasticizer, compatibilizer and flame retardant may be also mixed with the resin, if desired, by means of a tumbler, a super-mixer, a floater, a V-blender, a Nauta mixer, a Banbury mixer, an extruder or the like.

The polycarbonate resin obtained by the method of the present invention may be also used as a polymer alloy by kneading it with one member or two more members out of, for example, a synthetic resin such as aromatic polycarbonate, aromatic polyester, aliphatic polyester, polyamide, polystyrene, polyolefin, acryl, amorphous polyolefin, ABS and AS, a biodegradable resin such as polylactic acid and polybutylene succinate, and rubber.

According to the present invention, a polycarbonate resin excellent in the light resistance, transparency, color hue, heat resistance, thermal stability and mechanical strength and stable in the performance can be efficiently and stably produced.

EXAMPLES

The present invention is described in greater detail below by referring to Examples, but the present invention is not limited to these Examples as long as its purport is observed.

The compounds and reagents used in Examples are set forth below.

ISB: Isosorbide ("POLYSORB-P", trade name, produced by Roquette Freres) was used after simple distillation at an internal temperature of 155 to 158° C. (inner pressure: 400 Pa) under a nitrogen stream; each of the initial distillate and the bottom residue was 5 wt %.

CHDM: 1,4-Cyclohexanedimethanol (SKY CHDM, trade name, produced by New Japan Chemical Co., Ltd.)

DPC: Diphenyl carbonate (produced by Mitsubishi Chemical Corp.)

TMAH: Tetramethylammonium hydroxide pentahydrate (produced by Tokyo Chemical Industry Co., Ltd.)

Imidazole (produced by Tokyo Chemical Industry Co., Ltd.)

Diethanolamine (produced by Tokyo Chemical Industry Co., Ltd.)

TINUVIN 770DF (produced by BASF)

Disodium hydrogenphosphite pentahydrate (produced by Wako Pure Chemical Industries, Ltd.)

In the following, the analysis of ISB and the evaluations of physical properties of the polycarbonate resin were performed by the following methods.

1) Content of Nitrogen Atom in ISB

The sample was burned in an argon•oxygen atmosphere, and the combustion gas generated was measured by a trace nitrogen analyzer (TN-10 manufactured by Mitsubishi Chemical Analytech Co., Ltd.) using a combustion-chemiluminescence method. As the standard sample, a toluene solution of aniline was used.

2) Content of Sodium Atom in ISB

About 0.5 g of ISB was precisely weighed in a microwave decomposition vessel manufactured by PerkinElmer, Inc., and 2 mL of 97% sulfuric acid was added. The vessel was put into a closed state, microwave heated at 230° C. for 10 minutes and then cooled to room temperature, and 1.5 mL of 68% nitric acid was added thereto. This vessel was put into a closed state, microwave heated at 150° C. for 10 minutes and then cooled again to room temperature. Furthermore, 2.5 mL of 68% nitric acid was added, and the vessel was again put into a closed state and microwave heated at 230° C. for 10 minutes to completely decompose the contents. After cooling to room temperature, the liquid obtained above was diluted with pure water and quantitatively determined by ICP-MS manufactured by Thermo Quest Corp.

3) Content of Formic Acid in ISB

About 4 g of the sample was precisely weighed in a 10 mL-volume measuring flask and dissolved by adding demineralized water and after quantitatively determining formic acid from the area value of a predetermined peak in liquid chromatography by an absolute calibration method, the content was calculated.

The apparatus and conditions used are as follows.
Apparatus: manufactured by Shimadzu Corp.
    System controller: CBM-20A
    Pump: LC-10AD
    Column oven: CTO-10ASvp
    Detector: SPD-M20A
    Analysis column: Cadenza CD-18; 4.6 mmϕ×250 mm
    Oven temperature: 40° C.
Detection wavelength: 220 nm
Eluent: aqueous 0.1% phosphoric acid solution
Sample injection amount: 20 μL 3) Content of Furfural in ISB About 4 g of the sample was precisely weighed in a 10 mL-volume measuring flask and dissolved by adding demineralized water and after quantitatively determining furfural from the area value of a predetermined peak in liquid chromatography by an absolute calibration method, the content was calculated.

The apparatus and conditions used are as follows.
Apparatus: manufactured by Shimadzu Corp.
    System controller: CBM-20A
    Pump: LC-10AD
    Column oven: CTO-10ASvp
    Detector: SPD-M20A
    Analysis column: Cadenza CD-18; ϕ4.6 mm×250 mm
    Oven temperature: 40° C.
Detection wavelength: 273 nm
Eluent: demineralized water/acetonitrile/phosphoric acid=70/30/0.1
Sample injection amount: 10 μL 5) pH of ISB In a beaker, 15 g of the sample was weighed and dissolved by adding 50 g of demineralized water. The pH of the aqueous solution was measured using a glass electrode GTPH1B, a reference electrode GTRE10 and a thermometer GT5TSN (all manufactured by Mitsubishi Chemical Analytech Co., Ltd.). The electrode was previously calibrated by standard solutions of pH 4, pH 7 and pH 9 and then used for the measurement.

6) Color Hue (Solution YI) of ISB

In a beaker, 20 g of the sample was weighed and dissolved by adding 20 g of demineralized water. The solution was put into a glass cell having an optical path length of 2 cm and measured by a spectrocolorimeter CM-5 (manufactured by Konica Minolta Inc.) in transmission mode to determine the yellow index (YI) value of the solution. A smaller YI value indicates a lesser yellow tint.

7) Reduced Viscosity of Polycarbonate Resin

A polycarbonate resin solution having a concentration of 0.6 g/dL was prepared by using methylene chloride as a solvent and measured at a temperature of 20.0° C±0.1° C. by using an Ubbelohde viscosity tube manufactured by Moritomo Rika Kogyo, and the relative viscosity $\eta_{rel}$ was determined from the flow-through time $t_0$ of the solvent and the flow-through time t of the solution according to the following formula:

$$\eta_{rel}=t/t_0$$

The specific viscosity $\eta_{sp}$ was determined from the relative viscosity according to the following formula:

$$\eta_{sp}=(\eta-\eta_0)/\eta_0=\eta_{rel}-1$$

The reduced viscosity $\eta_{sp}/c$ was determined by dividing the specific viscosity by the concentration c (g/dL). A higher value indicates a larger molecular weight.

8) Color Hue (Pellet YI) of Polycarbonate Resin

The color hue of the polycarbonate resin was evaluated by measuring the YI value (yellow index value) in the reflected light on a pellet in accordance with ASTM D1925. As the apparatus, a spectrocolorimeter CM-5 manufactured by Konica Minolta Inc. was used, and as the measurement conditions, a measurement diameter of 30 mm and SCE were selected. Calibration glass CM-A212 for dish measurement was fitted into the measurement part, and a zero calibration box CM-A124 was put thereon to perform zero calibration. Subsequently, white calibration was performed using the built-in white calibration board. The measurement was performed using a white calibration board CM-A210, and it was confirmed that $L^*$ was 99.40±0.05, $a^*$ was 0.03±0.01, $b^*$ was −0.43±0.01, and YI was −0.58±0.01. The measurement of a pellet was performed by packing the pellets to a depth of about 40 mm of a cylindrical glass vessel having an inner diameter of 30 mm and a height of 50 mm. An operation of taking the pellets out of the glass vessel and again performing the measurement was repeated twice, and the average of measured values of three measurements in total was used. A smaller YI value indicates a lesser yellow tint of the resin and a higher color hue.

Example 1

Under a nitrogen stream (oxygen concentration; from 0.0005 to 0.001 vol %), isosorbide (ISB) in the solid state, tetramethylammonium hydroxide pentahydrate (TMAH) in an amount to account for 50 ppm by weight based on ISB, and disodium hydrogenphosphite pentahydrate in an amount to account for 1 ppm by weight were previously charged into a vessel equipped with a stirring blade and heated by a heating medium. At the point when melting began and stirring became possible, stirring was started to uniformly melt the entire amount and adjust the internal temperature to 80° C. After 12 hours from the start of melting, ISB in the melted state was sampled in a vat, solidified by water cooling, and put in an aluminum laminate bag under nitrogen, and the bag was heat-sealed and refrigeration stored.

The obtained sample was subjected to various analyses according to the methods described above. The nitrogen atom content of ISB was 3.7 ppm by weight, and the sodium atom content was 0.2 ppm by weight. The amount of formic acid contained in ISB was 1.3 ppm by weight, the amount of furfural was 13 ppb by weight, the pH was 7.7, and the solution YI was 0.55.

The thus-obtained ISB was charged into a vessel equipped with a stirring blade in a nitrogen stream (oxygen concentration: from 0.0005 to 0.001 vol %) and heated at 80° C. to prepared a melt. Similarly to ISB, each of 1,4-cyclohexanedimethanol (CHDM) and diphenyl carbonate (DPC) was charged into a vessel equipped with a stirring blade in a nitrogen stream (oxygen concentration: from 0.0005 to 0.001 vol %) and heated at 100° C. to prepare a melt. DPC was used after adjusting the chloride ion concentration to 10 ppb or less by distillative purification. Subsequently, under a nitrogen stream (oxygen concentration: from 0.0005 to 0.001 vol %), into a polymerization apparatus equipped with a stirring blade and a reflex condenser and kept at 100° C., respective raw materials in the melted state were charged in order of DPC, CHDM and ISB and stirred to prepare a uniform solution. The time from ISB started melting until mixed with DPC was 13.5 hours, combined with 12 hours above.

To the thus-prepared raw material, an aqueous calcium acetate solution was added as a polymerization catalyst. Respective raw materials were charged to have a given molar ratio (ISB/CHDM/DPC/calcium acetate=0.700/0.300/1.01/1.5×10$^{-6}$).

After the addition of catalyst, temperature rising was started, and the internal temperature reached 210° C. after 40 minutes. The system was controlled to keep this temperature. At the same time, pressure reduction was started and 90 minutes after reaching 210° C., the pressure reached 13.3 kPa (absolute pressure, hereinafter the same). While keeping this pressure, the system was further held for 15 minutes. A phenol vapor generated as a by-product with the progress of polymerization reaction was introduced into the reflux condenser at 100° C., monomer ingredients contained in a slight amount in the phenol vapor were returned to the polymerization reaction vessel, and uncondensed phenol vapor was subsequently introduced into a condenser at 45° C. and recovered.

After the pressure was once returned to atmospheric pressure by nitrogen, the contents where 90 wt % or more of ISB was oligomerized as above were transferred to another polymerization reaction apparatus equipped with a stirring blade and a reflux condenser controlled to 100° C., and temperature rising and pressure reduction were started, as a result, the internal temperature and the pressure reached 220° C. and 200 Pa, respectively, in 40 minutes. Thereafter, the pressure was adjusted to 133 Pa or less over 20 minutes, and a predetermined stirring power was achieved 115 minutes after start of the pressure reduction of the polymerization reaction apparatus of the second tank. After that, the pressure was recovered by nitrogen in the reaction tank. The contents were withdrawn in the form of a strand and then pelletized by a rotary cutter.

The reduced viscosity of the obtained polycarbonate resin was 0.465 dL/g, and the pellet YI was 12.3. The results are shown in Table 1.

Example 2

The production was performed in the same manner as in Example 1 except that at the time of melting ISB, disodium hydrogenphosphite pentahydrate was not added to ISB and only TMAH was added in an amount of 50 ppm by weight.

The nitrogen atom content of ISB after melting at 80° C. for 12 hours was 3.8 ppm by weight, and the sodium atom content was less than 0.1 ppm by weight. The amount of formic acid contained in ISB was 1.2 ppm by weight, the amount of furfural was 12 ppb by weight, the pH was 7.4, the solution YI was 0.51, and the same storage stability as in Example 1 was exhibited.

A predetermined stirring power was achieved 129 minutes after start of the reaction in the polymerization reaction apparatus of the second tank. The reduced viscosity of the obtained polycarbonate resin was 0.464 dL/g, the pellet YI was 11.3, and the color hue was slightly enhanced as compared with Example 1. The results are shown in Table 1.

Example 3

The production was performed in the same manner as in Example 1 except that at the time of melting ISB, disodium hydrogenphosphite pentahydrate was not added to ISB and only TMAH was added in an amount of 100 ppm by weight.

The nitrogen atom content of ISB after melting at 80° C. for 12 hours was 7.6 ppm by weight, and the sodium atom content was less than 0.1 ppm by weight. The amount of formic acid contained in ISB was 1.2 ppm by weight, the amount of furfural was 15 ppb by weight, the pH was 7.6, the solution YI was 0.54, and the same storage stability as in Example 1 was exhibited.

A predetermined stirring power was achieved 108 minutes after start of the reaction in the polymerization reaction apparatus of the second tank. The reduced viscosity of the obtained polycarbonate resin was 0.474 dL/g, the pellet YI was 13.4, and the same color hue as in Example 1 was exhibited. The results are shown in Table 1.

Comparative Example 1

The production was performed in the same manner as in Example 1 except that at the time of melting ISB, 200 ppm by weight of TMAH and 1 ppm by weight of disodium hydrogenphosphite pentahydrate were added to ISB.

The nitrogen atom content of ISB after melting at 80° C. for 12 hours was 15.3 ppm by weight, and the sodium atom content was 0.2 ppm by weight. The amount of formic acid contained in ISB was 1.3 ppm by weight, the amount of furfural was 13 ppb by weight, the pH was 8.8, the solution YI was 0.55, and the same storage stability as in Example 1 was exhibited.

A predetermined stirring power was achieved 94 minutes after start of the reaction in the polymerization reaction apparatus of the second tank. The reduced viscosity of the obtained polycarbonate resin was 0.477 dL/g, and the pellet YI was 16.6. The reaction rate was increased as compared with Example 1, but the color hue of the obtained polycarbonate resin was worsened. The results are shown in Table 1.

Example 4

The production was performed in the same manner as in Example 1 except that at the time of melting ISB, disodium hydrogenphosphite pentahydrate was not added to ISB and only triethylamine was added in an amount of 25 ppm by weight.

The nitrogen atom content of ISB after melting at 80° C. for 12 hours was 2.9 ppm by weight, and the sodium atom content was less than 0.1 ppm by weight. The amount of formic acid contained in ISB was 1.4 ppm by weight, the amount of furfural was 18 ppb by weight, the pH was 7.3, and the solution YI was 0.72, indicating that the color hue of ISB was slightly worsened as compared with that in Example 1.

A predetermined stirring power was achieved 120 minutes after start of the reaction in the polymerization reaction apparatus of the second tank. The reduced viscosity of the obtained polycarbonate resin was 0.466 dL/g, and the pellet YI was 14.5, indicating that the color hue of the obtained polycarbonate resin was slightly worsened as compared with that in Example 1. The results are shown in Table 1.

Example 5

The production was performed in the same manner as in Example 1 except that at the time of melting ISB, disodium hydrogenphosphite pentahydrate was not added to ISB and only imidazole was added in an amount of 10 ppm by weight.

The nitrogen atom content of ISB after melting at 80° C. for 12 hours was 4.0 ppm by weight, and the sodium atom content was less than 0.1 ppm by weight. The amount of formic acid contained in ISB was 1.3 ppm by weight, the amount of furfural was 13 ppb by weight, the pH was 7.5, the solution YI was 0.52, and the same storage stability as in Example 1 was exhibited.

A predetermined stirring power was achieved 121 minutes after start of the reaction in the polymerization reaction apparatus of the second tank. The reduced viscosity of the obtained polycarbonate resin was 0.460 dL/g, the pellet YI was 12.1, and a polycarbonate resin having the same color hue as in Example 1 was obtained. The results are shown in Table 1.

Example 6

The production was performed in the same manner as in Example 1 except that at the time of melting ISB, disodium hydrogenphosphite pentahydrate was not added to ISB and only TINUVIN 770DF was added in an amount of 50 ppm by weight.

The nitrogen atom content of ISB after melting at 80° C. for 12 hours was 2.9 ppm by weight, and the sodium atom content was less than 0.1 ppm by weight. The amount of formic acid contained in ISB was 1.2 ppm by weight, the amount of furfural was 12 ppb by weight, the pH was 7.5, the solution YI was 0.65, and the same storage stability as in Example 1 was exhibited.

A predetermined stirring power was achieved 123 minutes after start of the reaction in the polymerization reaction apparatus of the second tank. The reduced viscosity of the obtained polycarbonate resin was 0.462 dL/g, the pellet YI was 14.0, and a polycarbonate resin having the same color hue as in Example 1 was obtained. The results are shown in Table 1.

Comparative Example 2

The production was performed in the same manner as in Example 1 except that at the time of melting ISB, 50 ppm by weight of disodium hydrogenphosphite pentahydrate was added to ISB.

The nitrogen atom content of ISB after melting at 80° C. for 12 hours was less than 0.3 ppm by weight, and the sodium atom content was 10.6 ppm by weight. The amount of formic acid contained in ISB was 8.5 ppm by weight, the amount of furfural was 80 ppb by weight, the pH was 6.4, the solution YI was 0.90, and the degree of deterioration of ISB was large as compared with Example 1.

A predetermined stirring power was achieved 58 minutes after start of the reaction in the polymerization reaction apparatus of the second tank. The reduced viscosity of the obtained polycarbonate resin was 0.481 dL/g, the pellet YI was 35.1, and the color hue of the obtained polycarbonate resin was significantly worsened. The results are shown in Table 1.

Comparative Example 3

Under a nitrogen stream (oxygen concentration; from 0.0005 to 0.001 vol %), ISB in the solid state and disodium hydrogenphosphite pentahydrate in an amount to account for 50 ppm by weight based on ISB were previously charged into a distillation vessel equipped with a stirring blade and heated by a heating medium. At the point when melting began and stirring became possible, stirring was started to uniformly melt the entire amount. Subsequently, the pressure of the vessel was gradually lowered, and heating was performed. At the point when the internal pressure became 133 to 266 Pa and the internal temperature became 160° C., distillation began, and after sampling 25.5 parts by weight of initial distillate, 403.5 parts by weight of main distillate and 28.5 parts by weight of latter distillate were collected, leaving the remaining as bottom residue in the vessel. The internal temperature of the receiver for the main distillate was adjusted to 80° C. After 12 hours from the start of sampling of the main distillate, ISB in the melted state was sampled in a vat, solidified by water cooling, and put in an aluminum laminate bag under nitrogen, and the bag was heat-sealed and stored.

The obtained sample was subjected to various analyses according to the methods described above. The nitrogen atom content of ISB was less than 0.3 ppm by weight, and the sodium atom content was less than 0.1 ppm by weight. The amount of formic acid contained in ISB was 12.2 ppm by weight, the amount of furfural was 250 ppb by weight, the pH was 5.8, the solution YI was 1.77, and deterioration of ISB proceeded during melt storage as compared with Example 1.

The polymerization reaction was performed in the same manner as in Example 1. A predetermined stirring power was achieved 153 minutes after start of the reaction in the polymerization reaction apparatus of the second tank. The reduced viscosity of the obtained polycarbonate resin was 0.452 dL/g, and the pellet YI was 20.4. As compared with Example 1, the reaction rate was reduced and the color hue of the obtained polycarbonate resin was also worsened. The results are shown in Table 1.

Example 7

The production was performed in the same manner as in Comparative Example 3 except that at the time of melting ISB, disodium hydrogenphosphite pentahydrate was not added to ISB and only TMAH was added in an amount of 50 ppm by weight. After sampling 25.0 parts by weight of initial distillate by distillation, 401.3 parts by weight of main distillate and 29.9 parts by weight of latter distillate were collected, leaving the remaining as bottom residue in the vessel.

The nitrogen atom content of ISB 12 hours after the start of sampling of the main distillate was 3.0 ppm by weight, and the sodium atom content was less than 0.1 ppm by weight. The amount of formic acid contained in ISB was 1.2 ppm by weight, the amount of furfural was 35 ppb by weight, the pH was 7.1, the solution YI was 0.68, and the color hue of ISB was slightly worsened as compared with Example 1.

The polymerization reaction was performed in the same manner as in Example 1. A predetermined stirring power was achieved 129 minutes after start of the reaction in the polymerization reaction apparatus of the second tank. The reduced viscosity of the obtained polycarbonate resin was 0.464 dL/g, the pellet YI was 14.3, and the color hue of the obtained polycarbonate resin was slightly worsened as compared with Example 1. The results are shown in Table 1.

Comparative Example 4

The production was performed in the same manner as in Example 1 except that at the time of melting ISB, neither disodium hydrogenphosphite pentahydrate nor TMAH was added.

The nitrogen atom content of ISB after melting at 80° C. for 12 hours was less than 0.3 ppm by weight, and the sodium atom content was less than 0.1 ppm by weight. The amount of formic acid contained in ISB was 10.5 ppm by weight, the amount of furfural was 182 ppb by weight, the pH was 5.4, the solution YI was 1.03, and deterioration of ISB proceeded during melt storage as compared with Example 1.

A predetermined stirring power was achieved 162 minutes after start of the reaction in the polymerization reaction apparatus of the second tank. The reduced viscosity of the obtained polycarbonate resin was 0.453 dL/g, and the pellet YI was 33.5. As compared with Example 1, the reaction rate was reduced, and the color hue of the obtained polycarbonate resin was also worsened. The results are shown in Table 1.

Example 8

The production was performed in the same manner as in Example 1 except that at the time of melting ISB, disodium hydrogenphosphite pentahydrate was not added to ISB and only diethanolamine was added in an amount of 25 ppm by weight.

The nitrogen atom content of ISB after melting at 80° C. for 12 hours was 3.2 ppm by weight, and the sodium atom content was less than 0.1 ppm by weight. The amount of formic acid contained in ISB was 1.2 ppm by weight, the amount of furfural was 10 ppb by weight, the pH was 7.3, and the solution YI was 0.47.

A predetermined stirring power was achieved 120 minutes after start of the reaction in the polymerization reaction apparatus of the second tank. The reduced viscosity of the obtained polycarbonate resin was 0.475 dL/g, and the pellet YI was 10.5 revealing good color hue. The results are shown in Table 1.

Example 9

The production was performed in the same manner as in Example 8 except that at the time of melting ISB, 2,6-di-tert-butyl-p-cresol (hereinafter, sometimes simply referred to as BHT) was added in an amount of 25 ppm by weight. The results are shown in Table 1.

Example 10

The production was performed in the same manner as in Example 1 except that ISB in the melted state 48 hours after the start of melting was sampled in a vat, solidified by water cooling and put in an aluminum laminate bag under nitrogen and the bag was heat-sealed and refrigeration stored. As compared with Example 1, the polymerization was slightly reduced, and the color hue of the obtained polycarbonate resin was worsened. The results are shown in Table 1.

TABLE 1

| | | | Example 1 | Example 2 | Example 3 | Comparative Example 1 | Example 4 | Example 5 | Example 6 |
|---|---|---|---|---|---|---|---|---|---|
| Stabilizer | TMAH | ppm by weight | 50 | 50 | 100 | 200 | — | — | — |
| | Triethylamine | | — | — | — | — | 25 | — | — |
| | Imidazole | | — | — | — | — | — | 10 | — |
| | TINUVIN 770DF | | — | — | — | — | — | — | 50 |
| | Diethanolamine | | — | — | — | — | — | — | — |
| | Disodium hydrogenphosphite pentahydrate | | 1 | — | — | 1 | — | — | — |
| | BHT | | — | — | — | — | — | — | — |
| Element Contained | N Atom content | ppm by weight | 3.7 | 3.8 | 7.6 | 15.3 | 2.9 | 4.0 | 2.9 |
| | Na Atom content | | 0.2 | <0.1 | <0.1 | 0.2 | <0.1 | <0.1 | <0.1 |
| Thermal Stability Test | Amount of formic acid generated | ppm by weight | 1.3 | 1.2 | 1.2 | 1.3 | 1.4 | 1.3 | 1.2 |
| | Amount of furfural generated | ppb by weight | 13 | 12 | 15 | 13 | 18 | 13 | 12 |
| | pH | — | 7.7 | 7.4 | 7.6 | 8.8 | 7.3 | 7.5 | 7.5 |
| | Solution YI | — | 0.55 | 0.51 | 0.54 | 0.55 | 0.72 | 0.52 | 0.65 |
| Polymerization Test | Reaction time of second tank | min | 115 | 129 | 108 | 94 | 120 | 121 | 123 |
| | Reduced viscosity | dL/g | 0.465 | 0.464 | 0.474 | 0.477 | 0.466 | 0.460 | 0.462 |
| | Pellet YI | — | 12.3 | 11.3 | 13.4 | 16.6 | 14.5 | 12.1 | 14.0 |

| | | | Comparative Example 2 | Comparative Example 3 | Example 7 | Comparative Example 4 | Example 8 | Example 9 | Example 10 |
|---|---|---|---|---|---|---|---|---|---|
| Stabilizer | TMAH | ppm by weight | — | — | 50 | — | — | — | 50 |
| | Triethylamine | | — | — | — | — | — | — | — |
| | Imidazole | | — | — | — | — | — | — | — |
| | TINUVIN 770DF | | — | — | — | — | — | — | — |
| | Diethanolamine | | — | — | — | — | 25 | 25 | — |
| | Disodium hydrogenphosphite pentahydrate | | 50 | 50 | — | — | — | — | 1 |
| | BHT | | — | — | — | — | — | 25 | — |
| Element Contained | N Atom content | ppm by weight | <0.3 | <0.3 | 3.0 | <0.3 | 3.2 | 3.3 | 3.7 |
| | Na Atom content | | 10.6 | <0.1 | <0.1 | <0.1 | <0.1 | <0.1 | 0.2 |
| Thermal Stability Test | Amount of formic acid generated | ppm by weight | 8.5 | 12.2 | 1.2 | 10.5 | 1.2 | 1.2 | 5.5 |
| | Amount of furfural generated | ppb by weight | 80 | 250 | 35 | 182 | 10 | 10 | 55 |
| | pH | — | 6.4 | 5.8 | 7.1 | 5.4 | 7.3 | 7.3 | 7.5 |
| | Solution YI | — | 0.90 | 1.77 | 0.68 | 1.03 | 0.47 | 0.52 | 0.90 |
| Polymerization Test | Reaction time of second tank | min | 58 | 153 | 129 | 162 | 120 | 115 | 150 |
| | Reduced viscosity | dL/g | 0.481 | 0.452 | 0.464 | 0.453 | 0.475 | 0.480 | 0.460 |
| | Pellet YI | — | 35.1 | 20.4 | 14.3 | 33.5 | 10.5 | 9.5 | 15.0 |

While the invention has been described in detail and with reference to specific embodiments thereof, it will be apparent to one skilled in the art that various changes and modifications can be made therein without departing from the spirit and scope of the invention. This application is based on Japanese Patent Application (Patent Application No. 2011-076173) filed on Mar. 30, 2011, the contents of which are incorporated herein by way of reference.

Industrial Applicability

According to the production method of a polycarbonate resin of the present invention, a polycarbonate resin excellent in the light resistance, transparency, color hue, heat resistance, thermal stability and mechanical strength and stable in the performance can be efficiently and stably produced.

The invention claimed is:

1. A method for producing a polycarbonate resin, comprising a step of performing polycondensation through a transesterification reaction in the presence of a transesterification catalyst by using a dihydroxy compound as a raw material compound and a carbonic acid diester, wherein:
the dihydroxy compound comprises at least an aliphatic dihydroxy compound having an etheric oxygen atom on at least one β-position or γ-position of a hydroxy group,
the raw material compound comprises a nitrogen-containing compound in an amount of 0.3 ppm to less than 10 ppm in terms of weight concentration of nitrogen atom based on the aliphatic dihydroxy compound, and
the production method of a polycarbonate resin comprises a step of previously heating the aliphatic dihydroxy compound at 50° C. or more, holding the compound in the melted state for 0.5 to 200 hours, and then mixing the melt with a carbonic acid diester.

2. The method for producing a polycarbonate resin according to claim 1, comprising a step of mixing the aliphatic dihydroxy compound with a melted carboxylic acid diester.

3. The method for producing a polycarbonate resin according to claim 1, wherein the raw material compound is a raw material compound comprising an aliphatic dihydroxy compound obtained by heating the aliphatic dihydroxy compound that is a solid, in the presence of a nitrogen-containing compound to form a melted state and then distilling and purifying the melt and the content of the nitrogen-containing compound in the raw material compound is from 0.3 ppm to less than 10 ppm in terms of weight concentration of nitrogen atom based on the aliphatic dihydroxy compound.

4. The method for producing a polycarbonate resin according to claim 1, wherein the aliphatic dihydroxy compound that is a solid is heated in the presence of a nitrogen-containing compound to form a melted state and then used as a raw material compound of a polycarbonate resin without distilling and purifying the melt.

5. The method for producing a polycarbonate resin according to claim 1, comprising a step of, after the solid aliphatic dihydroxy compound is put into a melted state, adding the transesterification catalyst and performing polycondensation through a transesterification reaction.

6. The method for producing a polycarbonate resin according to a claim 1, wherein the nitrogen-containing compound is an alkanolamine.

7. The method for producing a polycarbonate resin according to claim 1, wherein the raw material compound comprises a hindered phenolic antioxidant.

8. The method for producing a polycarbonate resin according to claim 1, wherein heating of the aliphatic dihydroxy compound is performed at 70° C. to less than 100° C.

9. The method for producing a polycarbonate resin according to claim 1, comprising a step of mixing the aliphatic dihydroxy compound and the carboxylic acid diester, wherein the step is performed at 80° C. to less than 130° C.

10. The method for producing a polycarbonate resin according to claim 1, wherein the step at the stage of 90 wt % or more of the aliphatic dihydroxy compound being consumed in the transesterification reaction is performed at less than 230° C.

11. The method for producing a polycarbonate resin according to claim 1, wherein the raw material compound comprises a sodium compound and the content of the sodium compound is less than 2 ppm in terms of weight concentration of sodium atom based on the aliphatic dihydroxy compound.

12. The method for producing a polycarbonate resin according to claim 1, wherein at least one metal compound selected from the group consisting of lithium and metals belonging to Group 2 of the long-form periodic table is used as the transesterification catalyst in an amount of 0.1 to 30 µmol in terms of total amount of metal atoms per mol of all dihydroxy compounds used as the raw material.

13. The method for producing a polycarbonate resin according to claim 12, wherein the transesterification catalyst is at least one compound selected from the group consisting of a magnesium compound and a calcium compound.

14. The method for producing a polycarbonate resin according to claim 1, wherein the maximum temperature of the reaction solution is less than 250° C. at all reaction stages.

15. The method for producing a polycarbonate resin according to claim 1, wherein the aliphatic dihydroxy compound has a cyclic ether structure.

16. The method for producing a polycarbonate resin according to claim 1, wherein the aliphatic dihydroxy compound is a compound represented by the following formula (2):

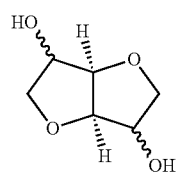

(2)

* * * * *